(12) United States Patent
Takahashi et al.

(10) Patent No.: US 11,513,747 B2
(45) Date of Patent: Nov. 29, 2022

(54) INFORMATION PROCESSING DEVICE TRANSMITTING CONTENT DATA TO TARGET MANAGEMENT DEVICE

(71) Applicant: Brother Kogyo Kabushiki Kaisha, Nagoya (JP)

(72) Inventors: Eriko Takahashi, Nagoya (JP); Naoki Yoshida, Nagoya (JP); Takashi Nishizaki, Nagoya (JP); Shintaro Kunimoto, Kiyosu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/183,481

(22) Filed: Feb. 24, 2021

(65) Prior Publication Data
US 2021/0224006 A1 Jul. 22, 2021

Related U.S. Application Data

(63) Continuation of application No. PCT/JP2019/030753, filed on Aug. 5, 2019.

(30) Foreign Application Priority Data

Aug. 30, 2018 (JP) .............................. JP2018-161320

(51) Int. Cl.
*G06F 3/12* (2006.01)
*G06F 8/61* (2018.01)
(Continued)

(52) U.S. Cl.
CPC .......... *G06F 3/1225* (2013.01); *G06F 3/1204* (2013.01); *G06F 3/1231* (2013.01);
(Continued)

(58) Field of Classification Search
CPC .... G06F 3/1225; G06F 3/1204; G06F 3/1231; G06F 3/1224; G06F 3/1229; G06F 3/123;
(Continued)

(56) References Cited

U.S. PATENT DOCUMENTS

| 9,038,052 B2* | 5/2015 | Ishimoto ................... G06F 8/65 717/169 |
| 2005/0144616 A1* | 6/2005 | Hammond ................ G06F 8/65 717/173 |

(Continued)

FOREIGN PATENT DOCUMENTS

| JP | 2005-267106 A | 9/2005 |
| JP | 2006-227971 A | 8/2006 |

(Continued)

OTHER PUBLICATIONS

International Search Report (with English translation) and Written Opinion dated Oct. 21, 2019, International Application No. PCT/JP2019/030753 (11 pages).

(Continued)

*Primary Examiner* — Kent Yip
(74) *Attorney, Agent, or Firm* — Burr & Brown, PLLC

(57) ABSTRACT

In an information processing device, a computer executes a device list download process to download a device list from a storage server. The device list includes a plurality of pieces of identification information corresponding to respective ones of a plurality of management target devices. The computer executes a connection determination process to determine for each management target device whether or not the management target device identified by the piece of identification information is connected to the information processing device via the communication interface. The computer executes a content data download process to download content data from the storage server via the communication interface. The computer executes a trans- (Continued)

mission process to transmit, to the device that is determined to be connected to the information processing device in the connection determination process, the content data which is downloaded in the content data download process and corresponds to the target management device.

16 Claims, 9 Drawing Sheets

(51) Int. Cl.
    *G06F 8/65*     (2018.01)
    *G06F 8/71*     (2018.01)

(52) U.S. Cl.
    CPC ................ *G06F 8/61* (2013.01); *G06F 8/65* (2013.01); *G06F 8/71* (2013.01)

(58) Field of Classification Search
    CPC ..... G06F 8/61; G06F 8/65; G06F 8/71; G06F 16/178; G06F 16/93
    USPC ....................................... 358/1.15
    See application file for complete search history.

(56) References Cited

U.S. PATENT DOCUMENTS

| | | |
|---|---|---|
| 2007/0143390 A1 | 6/2007 | Giambalvo et al. |
| 2013/0104121 A1 | 4/2013 | Iwaya et al. |
| 2015/0095905 A1 * | 4/2015 | Chakrabarti ........... G06Q 30/00 717/178 |
| 2015/0193223 A1 * | 7/2015 | Cardamore ............... G06F 9/44 717/170 |
| 2016/0337534 A1 | 11/2016 | Kano et al. |
| 2019/0102160 A1 * | 4/2019 | Shogaki .............. H04L 63/0435 |

FOREIGN PATENT DOCUMENTS

| | | | |
|---|---|---|---|
| JP | 2007-510987 A | | 4/2007 |
| JP | 2012-003329 A | | 1/2012 |
| JP | 2016-200942 A | | 12/2016 |
| JP | 2016-212731 A | | 12/2016 |
| JP | 2016200942 A | * | 12/2016 |
| WO | 2005/045671 A1 | | 5/2005 |

OTHER PUBLICATIONS

English translation of International Preliminary Report on Patentability (Chapter I) (Application No. PCT/JP2019/030753) dated Mar. 11, 2021, 12 pages.

Extended European Search Report dated Apr. 29, 2022 (Application No. 19854110.4).

Japanese Office Action (with English translation) dated Sep. 13, 2022 (Application No. 2018-161320).

* cited by examiner

FIG. 2
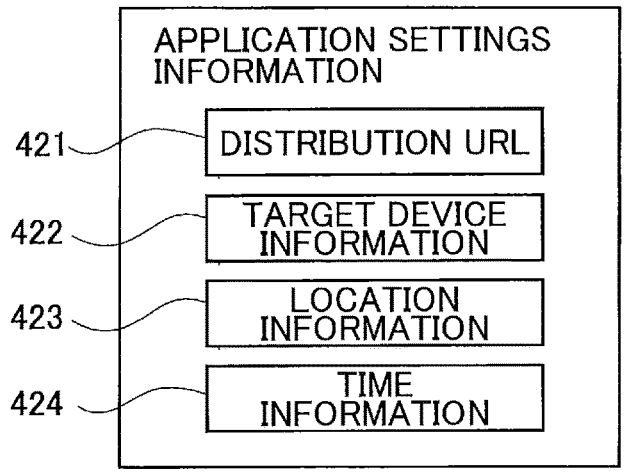
FIG. 3
| MODEL NAME | VERSION INFORMATION |
|---|---|
| MFP-XX1000 | 2.1 |
| MFP-XX2000 | 2.0 |
|  |  |
FIG. 4
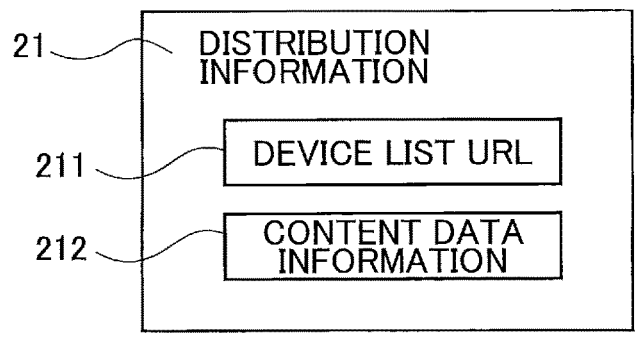

| MODEL NAME | TRANSMISSION FOLDER URL | VERSION |
|---|---|---|
| MFP-XX1000 | xxxx¥setting1000 | 2.1 |
| MFP-XX2000 | xxxx¥setting2000 | 2.1 |
| MFP-YY100 | xxxx¥setting100 | 3.4 |

"¥" in the URL of the transmission folder 23 is a yen symbol (0x5c, 5/12), and corresponds to a backslash of ASCII.

FIG. 6

| MODEL NAME | IP ADDRESS | SERIAL NO | LOCATION INFO | VERSION | UPDATE DATE | FINAL CHECK DATE |
|---|---|---|---|---|---|---|
| MFP-XX1000 | 10.100.1.1 | xxx0000456 | Shop A | 2.1 | 2018/7/3 | 2018/7/4 |
| MFP-XX2000 | 10.100.1.16 | | Shop A | 2.0 | 2018/7/2 | 2018/7/4 |
| MFP-YY100 | | xxx0000123 | Shop B | 3.4 | 2018/7/3 | 2018/7/4 |
| MFP-XX2000 | 10.100.2.1 | | Shop B | 1.9 | 2018/6/28 | 2018/6/28 |
| MFP-YY100 | | xxx0000234 | Shop C | 3.4 | 2018/6/28 | 2018/6/28 |
| MFP-XX1000 | 10.100.3.1 | | | | | |

221 222 223 224 225 226 227

22

INFORMATION PROCESSING DEVICE TRANSMITTING CONTENT DATA TO TARGET MANAGEMENT DEVICE

CROSS REFERENCE TO RELATED APPLICATION

This application is a by-pass continuation application of International Application No. PCT/JP2019/030753 filed Aug. 5, 2019 claiming priority from Japanese Patent Application No. 2018-161320 filed Aug. 30, 2018. The entire contents of the international application and the priority application are incorporated herein by reference.

TECHNICAL FIELD

The present disclosure relates to an application program and a data transmission system.

BACKGROUND

There is a conventional technique to download content data from a storage server. For example, in a known multifunction peripheral, a language data is incorporated. The multifunction peripheral has configurations to access the server and download the language data from the server.

SUMMARY

In the technique described above, a printer itself, which is a device as a download destination, determines whether to download the language data or not and the printer itself uses the language data. However, in the conventional technique, the downloaded language data is not used by other printers connected to the printer. Therefore, in a conceivable case that the download destination printer is further in connection with other printers, an administrator of the server is difficult to manage data used by such other printers. Further, in a conceivable case that the administrator of the server wishes to manage language data for a plurality of printers, the administrator needs to incorporate a program for downloading the language data from the server into all the printers. Accordingly, troublesome tasks are required.

The present disclosure provides a technique for an application program incorporated into an information processing device configured to be connected with a storage server for easily enabling a management of content data to be used by a plurality of devices connected to the information processing device via the storage server.

In order to attain the above and other objects, the disclosure provides a non-transitory computer readable storage medium storing a set of program instructions installed on and executed by an information processing device having a computer and a communication interface. The set of program instructions causes the computer to execute: a device list download process to download a device list from a storage server via the communication interface, the device list including a plurality of pieces of identification information corresponding to respective ones of a plurality of management target devices; a connection determination process to determine for each management target device included in the device list whether or not the management target device identified by the piece of identification information is connected to the information processing device via the communication interface; a content data download process to download content data from the storage server via the communication interface; and a transmission process to transmit, to the target management device that is determined to be connected to the information processing device in the connection determination process, the content data which is downloaded in the content data download process via the communication interface and corresponds to the target management device.

According to another aspect, the disclosure provides a data transmission system. The data transmission system includes a plurality of information processing devices, a storage server, and a plurality of management target devices. The storage server is configured to be connected to the plurality of information processing devices. The plurality of management target devices is configured to be connected to at least one of the plurality of information processing devices. The storage server stores content data and device list in a memory thereof. The device list includes a piece of identification information of each management target device among the plurality of management target devices. A set of program instructions is installed in the information processing device. The set of program instructions is readable by a computer of the information processing device. The set of program instructions causes the computer to further execute: a device list download process to download a device list from a storage server via the communication interface, the device list including a plurality of pieces of identification information corresponding to respective ones of a plurality of management target devices; a connection determination process to determine for each management target device included in the device list whether or not the management target device identified by the piece of identification information is connected to the information processing device via the communication interface; a content data download process to download content data from the storage server via the communication interface; and a transmission process to transmit, to the target management device that is determined to be connected to the information processing device in the connection determination process, the content data which is downloaded in the content data download process via the communication interface and corresponds to the target management device.

BRIEF DESCRIPTION OF THE DRAWINGS

The particular features and advantages of the disclosure as well as other objects will become apparent from the following description taken in connection with the accompanying drawings, in which:

FIG. 2 is an explanatory diagram illustrating application settings information;

FIG. 3 is an explanatory diagram illustrating a holding file list;

FIG. 4 is an explanatory diagram illustrating distribution information;

FIG. 5 is an explanatory diagram illustrating content data information;

FIG. 6 is an explanatory diagram illustrating a device list;

DETAILED DESCRIPTION

Figure 1:
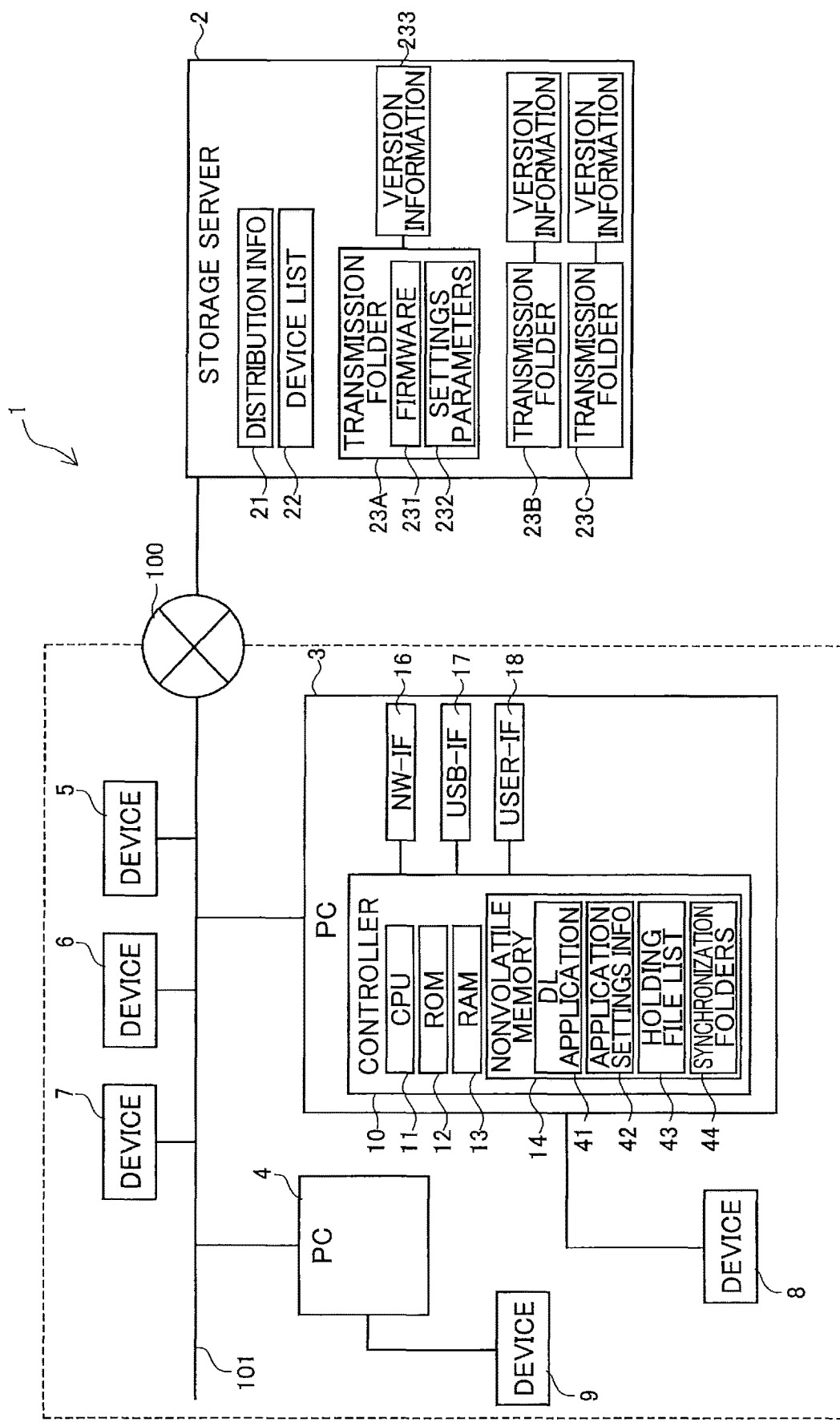
FIG. 1 is a block diagram illustrating electrical configuration of a system according to an embodiment.

An application program according to an embodiment will be described while referring to the drawings.

As shown in FIG. 1, a system 1 according to the embodiment includes a storage server 2, a personal computer (PC) 3, a PC 4, and devices 5-9. The PCs 3-4 are examples of an information processing device. Each of the devices 5-9 is a printer, a scanner, a copy machine, a multifunction peripheral, or a facsimile connected to at least one of the PCs 3 and 4, for example. The devices 5-9 are examples of a management target device. The system 1 is an example of a data transmission system.

As shown in FIG. 1, the PCs 3-4 can access the storage server 2 through the internet 100. The devices 5-7 are connected to the PCs 3-4 through a network 101. The devices 5-7 may be capable of connecting to the internet 100. The device 8 is in one-to-one connection with the PC 3 through a USB for example. The device 9 is in one-to-one connection with the PC 4 through the USB for example.

The number of devices included in the system 1 is not limited to that shown in FIG. 1. The system 1 may include one or more storage servers, one or more PCs, one or more devices connected to each PC. Instead of the PCs, mobile computers, tablet computers, or smartphones may be included in the system 1. As surrounded by a broken line shown in FIG. 1, it is assumed that the PCs 3-4 and the devices 5-9 are deployed in a prescribed range such as a same branch office. On the other hand, the storage server 2 is deployed at a location different from the branch office. FIG. 1 shows configurations deployed at the same branch office. However, practically, the system 1 includes PCs and devices deployed at each of a plurality of branch offices.

The storage server 2 is a storage device for storing a plurality of sets of data such as files, and folders online. The storage server 2 is Dropbox (registered trademark), Google drive (registered trademark), OneDrive (registered trademark), and iCloud (registered trademark), for example. Various types of sets of data stored in the storage server 2 are managed together by an administrator of the storage server 2 for example. The various types of sets of data stored in the storage server 2 can be added, modified, and deleted only by the administrator having a prescribed authority. On the other hand, authority authentication is not required for accessing the storage server 2 or reading data therefrom. The PCs 3 and 4 can read each set of data stored in the storage server 2. Sets of data stored in the storage server 2 will be described later.

As shown in FIG. 1, the PC 3 includes a controller 10 having a CPU 11, a ROM 12, a RAM 13, and a nonvolatile memory 14. The PC 3 further includes a network interface (hereinafter, referred to as "NW-IF") 16, a USB interface (hereinafter, referred to as "USB-IF") 17, and a user interface (hereinafter, referred to as "user IF") 18, which are electrically connected to the controller 10. The controller 10 is a generic term that covers hardware and software used for controlling the PC 3 and is not limited to a single piece of hardware present in the PC 3. Operations and configurations of the PC 4 is the same as those of the PC 3, and thus the PC 3 is only described as a representative example except for cases that it is not necessary to distinguishes the PCs 3 and 4.

The CPU 11 executes each process according to user's operations and a program read from the ROM 12 or the nonvolatile memory 14. The CPU 11 is an example of a computer. The ROM 12 stores a startup program for starting the PC 1. The RAM 13 is used as a work area when each process is executed, and a storage area temporarily storing data.

The nonvolatile memory 14 is an HDD or a flash memory, for example, and used for storing sets including sets of program data and sets of image data, and various settings. The nonvolatile memory 14 stores synchronization folders 44 and a DL application 41. Each 44. The synchronization folders 44 store sets of data and files to be transmitted to devices 5-8. The DL application 41 is for downloading files and sets of data which are to be stored in a corresponding synchronization folder 44. The DL application 41 is an example of an application program. A method for downloading synchronization folders 44 and etc. will be described later. The ROM 12, the RAM 13, and the nonvolatile memory 14 are examples of a memory. In a case that the CPU 11 has a CPU buffer, the CPU buffer is also an example of the memory.

Each example of the memory is a computer readable storage medium. The computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the internet are a computer-readable signal medium, which is one type of computer-readable medium but is not considered a non-transitory computer-readable storage medium.

The NW-IF 16 includes hardware for communicating with external devices via the internet 100. The NW-IF 16 further includes hardware for communicating with the devices 5-7 via the network 101. A communication method employed by the NW-IF 16 may be wired or wireless communications and conform to any standard. The USB-IF 17 includes hardware for executing communications conforming to the USB standard. The USB-IF 17 is an example of a local interface. The NW-IF 16 and the USB-IF 17 are examples of the communication interface. The PC 3 may further include communication interfaces conforming to other standards.

The user IF 18 includes hardware for receiving input operations by the user through a keyboard and a mouse, and hardware for displaying information on a screen. The PC 3 may include a touch panel having a display function and a function for receiving the input operations.

Next, an outline of a management method to manage each device in the system 1 will be described. In the system 1, the storage server 2 stores a plurality of transmission files to be transmitted to devices. The PC 3 executes the DL application 41 to download a transmission file corresponding to each device which is a target of management by the PC 3 itself, and to transmit each downloaded file to corresponding devices. The DL application 41 is previously distributed to the PC 3 by the administrator of the storage server 2, for example.

Configurations of each piece of information stored in the nonvolatile memory 14 of the PC 3 or a memory of the storage server 2 for managing a device will be described. While executing the DL application 41, the PC 3 refers to each piece of information, and rewrites each piece of information if necessary. Usage of each piece of information will be described later.

As shown in FIG. 1, the nonvolatile memory 14 of the PC 3 stores the DL application 41, an application settings information 42, a holding file list 43, and a plurality of synchronization folders 44. The DL application 41 is an application for controlling the PC 3 to automatically execute management operations of devices. The application settings information 42 and the holding file list 43 are information to be referred while the DL application 41 is executed. The application settings information 42 together with the DL application 41 is previously distributed to the PC 3 by the administrator of the storage server 2.

As described later, a DL application process (FIG. 8) is started by executing the DL application 41 by the CPU 11. The DL application process uses the application settings information 42, the holding file list 43, and the plurality of synchronization folders 44. That is, the application settings information 42, the holding file list 43, and the plurality of synchronization folders 44 are data stored corresponding to the DL application 41.

As shown in FIG. 2, the application settings information 42 includes a distribution URL 421, target device information 422, location information 423, and time information 424. The distribution URL 421 is information designating a storage location of distribution information 21 described later. The target device information 422 is information indicating a range of management target devices managed by the PC 3. Specifically, the target device information 422 is information as to whether devices connected to the network are included in the management targets or not. The location information 423 is information indicating a location of the PC itself. The time information 424 is information indicating execution timing of file transmission by the DL application 41.

As shown in FIG. 3, the holding file list 43 stores, for each model of devices connected to the PC 3, a piece of version information of the synchronization folder 44 which has been downloaded to the PC 3. That is, in the holding file list 43, a model name and version information are stored so that the model name and the version information are associated with each other.

The synchronization folder 44 is a folder to store files and sets of data to be transmitted to management target devices. The storage server 2 stores files and sets of data to be transmitted in a folder as a transmission folder. The synchronization folder 44 is a folder generated by downloading the transmission folder stored in the storage server 2 and storing the downloaded transmission folder in the nonvolatile memory 14 of the PC itself. The synchronization folder 44 is a folder synchronized with the transmission folder of the storage server 2.

The synchronization folder 44 is provided for each model of the devices.

On the other hand, as shown in FIG. 1, the storage server 2 stores the distribution information 21, a device list 22, a plurality of types of transmission folders 23 such as transmission folders 23A, 23B, and 23C. The transmission folder is provided for each model of devices of transmission targets. In the following description, each transmission folder is simply referred to as the transmission folder 23 except for cases that it is not necessary to distinguish these folders.

As shown in the example of the transmission folder 23A of FIG. 1, the transmission folder 23 includes a plurality of files and sets of data including a firmware 231 and settings parameters 232. Version information 233 is attached to the transmission folder 23. The version information 233 is information indicating a version of the transmission folder 23. In a case that at least one of files and etc. stored in the transmission folder 23 is updated, the version information 233 is also updated. The transmission folder 23 is an example of a content set. The firmware 231 and the settings parameters 232 are examples of content data. The settings parameters 232 is an example of first type content data.

As shown in FIG. 4, the distribution information 21 includes a device list URL 211 and content data information 212. The device list URL 211 is information designating a storage location of the device list 22. As shown in FIG. 5, the content data information 212 includes, for each model of devices, information designating a storage location of a latest transmission folder 23 for a model and version information of the latest transmission folder 23. That is, a URL of the latest transmission folder 23 and the version information 233 of the latest transmission folder 23 are stored in the content data information 212 so that the URL and the version information 233 are associated with a model name of devices which are transmission targets.

The symbol "¥" in the URL of the transmission folder 23 in FIG. 5 is a yen symbol (0x5c, 5/12), and corresponds to a backslash of ASCII.

The device list 22 is a list for all the devices that are management targets managed by the administrator of the storage server 2. As shown in FIG. 6, the device list 22 includes a device record for each of management target devices. Each device record stores model information 221, an IP address 222, a serial number 223, location information 224, version information 225, an update date 226, and a final check date 227 which are associated with one another. The model information 221 is information indicating a name of the corresponding device.

Each of the IP address 222 and the serial number 223 is identification information for identifying an individual device. In a case that a device is connected to the PCs 3 and 4 through the network 101, the IP address 222 included in the device record specifies an IP address of the device. The IP address 222 indicates address information of the device, and an example of first identification information. In a case that a device is not connected to the network 101, the serial number included in the device record specifies a serial number of the device. The serial number 223 is an example of second identification information. Each device record satisfies at least one of a condition that the IP address 222 specifies an IP address of the device and a condition that the serial number 223 specifies a serial number of the device.

Thee location information 224 is information designating an installation location of the corresponding device. The location information 224 corresponds to a name of a branch office, a name of a department, or an address, for example. The version information 225 is information indicating a version of the transmission folder 23 storing files and etc. which have been transmitted to the corresponding device. Each of the update date 226 and the final check date 227 indicate date on which the PC 3 executes the management process for the corresponding device.

The distribution information 21 and the transmission folder 23 are information to which the PC 3 can refer only and in which the PC 3 cannot write data. The distribution information 21 and the transmission folder 23 are information managed by the administrator of the storage server 2. On the other hand, the device list 22 is information to which the PC 3 can refer and in which the PC 3 write data. The PC 3 refers to the device list 22 while executing the DL application 41, and uploads information of execution results.

Figure 7:
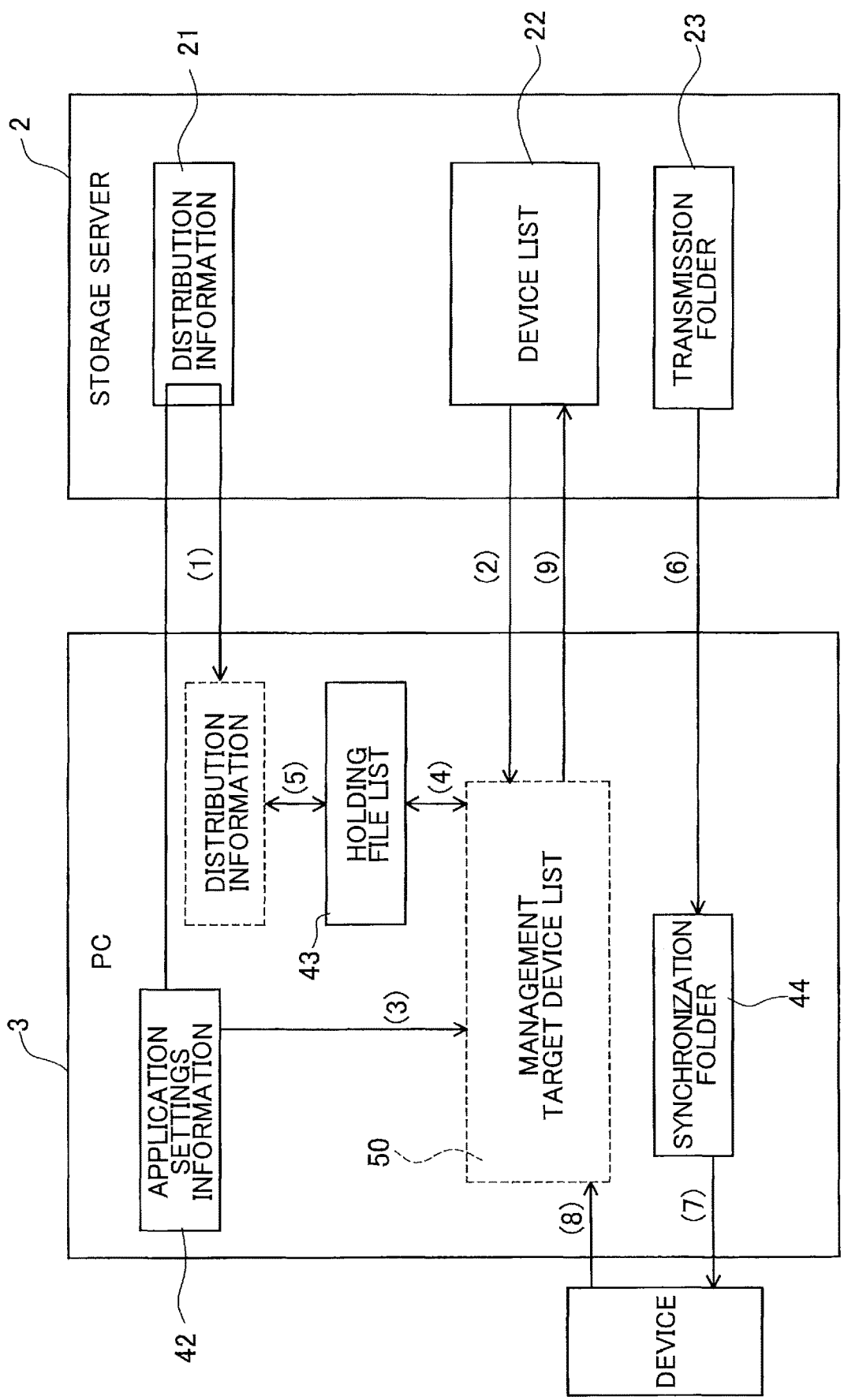
FIG. 7 is an explanatory diagram illustrating an overview of device management operations.

Next, an outline of management operations of devices executed by the PC 3 will be described while referring to FIG. 7. (1) By executing the DL application 41, the PC 3 reads the application settings information 42 shown in FIG.

2 and downloads the distribution information 21 shown in FIG. 4 from the storage server 2 based on the distribution URL 421. In FIG. 7, information temporarily generated during execution of the management operations is surrounded by a broken line.

(2) The PC 3 downloads the device list 22 shown in FIG. 6 from the storage server 2 based on the device list URL 211 of the distribution information 21. Further, (3) the PC 3 determines a connection state of each device based on the downloaded device list 22, and the target device information 422 and location information 423 of the application settings information 42, and generates a management target device list 50. The management target device list 50 is a list of devices of management targets managed by the PC itself. The management target device list 50 includes for each device a record having configurations similar to those in the device record in the device list 22.

(4) The PC 3 acquires a model name of each device in the management target device list 50, acquires the version information of the synchronization folder 44 corresponding to the model from the holding file list 43 shown in FIG. 3. Further, (5) the PC 3 acquires the latest version information of the model from the content data information 212 and compares the latest version information with the version information of the synchronization folder 44. In a case that the version of the synchronization folder 44 is the latest version of the model, it is not needed to download the transmission folder 23 of this model.

On the other hand, in a case that the version of the synchronization folder 44 is not the latest version, (6) the PC 3 downloads the latest transmission folder 23 based on the URL of the transmission folder URL in the content data information 212, and stores the downloaded latest transmission folder 23 as the synchronization folder 44 of the corresponding model. Further, (7) the PC 3 transmits files and sets of data stored in the synchronization folder 44 to the device(s) of the corresponding model from among devices included in the management target device list 50. Accordingly, the firmware and the settings parameters of the target device(s) are updated to the latest version.

(8) The PC 3 writes execution results in the management target device list 50. Specifically, in a case that the PC 3 completes the transmission, the PC 3 updates the version information 225 to indicate the version of the transmitted synchronization folder 44, and overwrites the update date 226 and the final check date 227 to the date of the transmission. In a case that the transmission is not needed, or in a case that the transmission cannot be executed though the download is complete, the PC 3 updates the final check date 227 only. (9) The PC 3 downloads the device list 22 again, and merges the management target device list 50 with the device list 22, and uploads the resultant device list 22. The administrator of the storage server 2 can understand a situation of each device by referring to the device list 22.

The DL application process that enables the management operations of devices described above will be described while referring to a flowchart shown in FIG. 8. The PC 3 automatically reads the DL application 41 when the PC 3 starts or when a user is logged on the PC 3. The CPU 11 of the PC 3 automatically starts execution of the DL application process according to the read DL application 41. The CPU 11 executes the DL application process without receiving user's instruction via the user IF 18.

In general, each processing step in following processes and flowcharts indicates step performed by the CPU 11 according to instructions described in programs such as the DL application 41. In other words, actions such as "determine," "extract," "select," "decide," "identify," "acquire," "control," and the like in the following description represent processes performed by the CPU 11. Processes performed by the CPU 1 include processes that control hardware through APIs of an OS. In this specification, each program is described while omitting description of the OS. That is, in the following description, phrases such as "the program B controls the hardware C" may indicate "the program B controls the hardware C using APIs of the OS". Processes of the CPU 11 according to instructions described in a program may be described in abbreviated description, such as "the CPU 11 executes" and "the DL application 41 executes".

"Acquiring" is used as a concept which does not necessarily require a request. In other words, the process in which the CPU 11 receives data without requesting is included in the concept of "the CPU 11 acquires data." "Data" as described herein refer to bit strings that can be read by a computer. Data of different formats are treated as the same data when the content of the data is essentially the same. The same holds true for "information" in this specification. A "request" and an "instruction" are concepts of outputting to a destination information indicating that a request is made and information indicating that an instruction is made. Information indicating that a request is made and information indicating that an instruction is made will be referred to simply as "a request" and "an instruction".

Further, a process performed by the CPU 11 to determine whether information A indicates circumstance B may be described conceptually as "determining whether circumstance B based on information A." A process in which the CPU determines whether information A indicates circumstance B or circumstance C may be described conceptually as "determining whether circumstance B or circumstance C based on information A."

In S101 the CPU 11 reads the distribution URL 421 from the application settings information 42. In S102 the CPU 11 accesses a storage location indicated by the distribution URL 421 to download the distribution information 21 from the storage server 2. S102 is an example of a distribution download process. As shown in FIG. 4, the distribution information 21 includes the device list URL 211 and the content data information 212.

A network interface (the NW-IF 16 in the embodiment) exists on a communication path between devices and the PC 3 which are connected each other via the network 101. Thus, naturally, the PC 3 communicates with devices (for example, the devices 5-7 or the storage server 2) via the network interface (the NW-IF 16).

In S103 the CPU 11 accesses the storage location designated by the device list URL 211 to download the device list 22. S103 is an example of a device list download process. S103 is an example of the device list download process at first timing. The PC 3 accesses the device list 22 by the distribution information 21. Thus, in cases that the storage location of the device list 22 is changed, the PC 3 need not modify data that is stored in the PC 3, and can easily adapt such cases.

In S104 the CPU 11 executes a target device determination process. The target device determination process is a process for determining devices of management targets based on the downloaded device list 22, and generating the management target device list 50.

Figure 9:
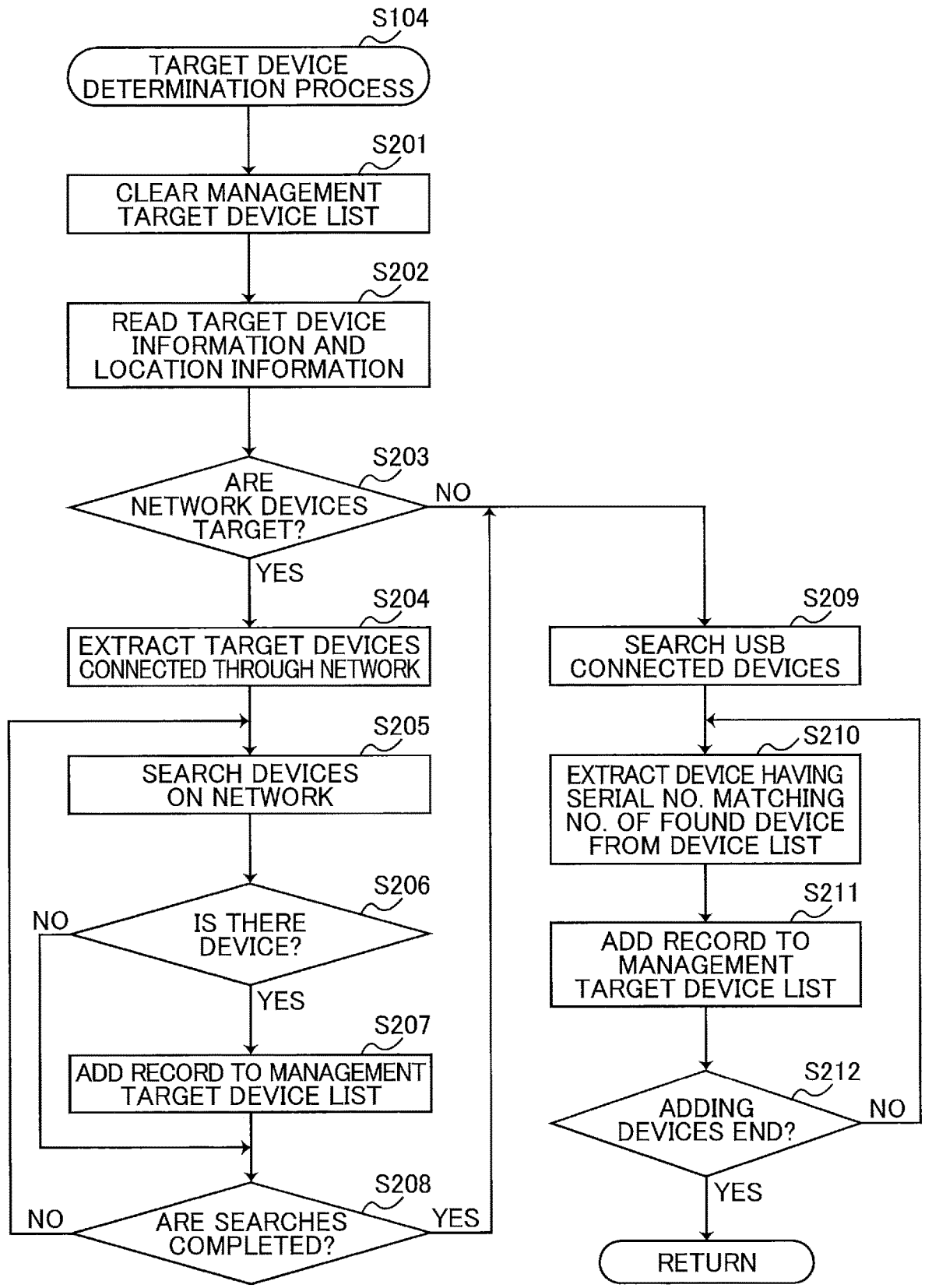
FIG. 9 is a flowchart illustrating a target device determination process.

The target device determination process will be described while referring to a flowchart shown in FIG. 9. In S201 of the target device determination process, the PC 3 clears the management target device list 50. That is, the CPU 11 prepares the management target device list 50 in which no data is included.

In S202 the CPU 11 reads the target device information 422 and the location information 423 from the application settings information 42 stored in the nonvolatile memory 14. The target device information 422 is an example of a transmission target information. S202 is an example of a transmission target information reading process. The location information 423 is an example of device self location information. S202 is an example of a device self-location information reading process.

The location information 423 is a name of a branch office, for example, and designates an installation location of the PC itself. In the embodiment, the PC 3 manages only devices installed in a same branch office in which the PC 3 itself is installed. That is, only devices having location information 224 matching the location information 423 of the application settings information 42 are devices of management targets among devices included in the downloaded device list 22. In the embodiment, all the devices are managed by any one of PCs. Thus, even if a device is connected to the PC 3, such a device may not be a device of management target managed by the PC 3.

In S203 the CPU 11 determines whether or not devices connected to the PC 3 itself through the network are devices of management targets based on the target device information 422. The target device information 422 is information indicating whether devices connected to the PC itself through the network are devices of management targets among devices connected to the PC itself. In a case that the target device information 422 can be read, the CPU 11 determines that the devices are devices of management targets.

The target device information 422 may be a value of a prescribed flag for example. In this case, if the CPU 11 reads the prescribed flag and the value thereof is "1", the CPU 11 determines that the devices connected to the PC through the network are devices of management targets. However, the value of the read prescribed flag is other than "1", the CPU 11 determines that the devices connected to the PC through the network are not devices of management targets. In this example, information indicating that the prescribed flag is the value "1" is an example of a transmission target information.

Alternatively, the target device information 422 may be a prescribed file. In this case, in a case that the prescribed file exists in the memory, the CPU 11 determines that devices connected to the PC to the PC through the network are devices of management targets on the basis of successful reading of the prescribed file. In a case that the prescribed file does not exist in the memory, the CPU 11 determines that devices connected to the PC through the network are not devices of management targets on the basis of failure of reading the prescribed file. In this example, the prescribed file is an example of transmission target information.

As shown in FIG. 1 for example, in a case that the plurality of PCs 3-4 connected each other through the network 101 exists in one branch office, only one of the PCs 3-4 (the PC 3 for example) is provided with information indicating that devices connected to the PC through the network are devices of management targets, but other PCs (the PC 4 for example) are not provided with information indicating that devices connected to the PC through the network are devices of management targets. In this case, the devices 5-7 connected to the network are managed only by the PC 3. Using the target device information 422 can prevent occurrence of a situation that one device is managed by a plurality of PCs and occurrence of reduplication transmissions.

On the other hand, a device is in one-to-one connection with one PC only, the connected PC need to manage such a device. In the example shown in FIG. 1, the device 9 cannot be managed by the PC 3. Thus, in the embodiment, even in a case that a plurality of PCs exists in one branch office, all the PCs execute the DL application process. In the example shown in FIG. 1, both the PCs 3 and 4 have the DL application 41, and the target device information 422 of the PC 3 is different from that of the PC 4. Thus, the PC 3 determines that the devices 5-8 are devices of management targets, and the PC 4 determines that only the device 9 is a device of management target. Alternatively, the PC 3 may determine that only the device 8 is a device of management target, and the PC 4 may determine that the device 5-7 and 9 are devices of management targets.

Returning to FIG. 9, in a case that devices connected to the PC through the network are determined to be devices of management target (S203: YES), in S204 the CPU 11 extracts network devices of management targets connected to the PC through the network from the device list 22 downloaded in S103. Specifically, the CPU 11 extracts, as a candidate for management target device, each device whose location information 224 in the device list 22 matches the location information 423 of the application settings information 42 and whose IP address information 222 in the device list 22 specifies an IP address.

In S205 the CPU 11 searches one of the extracted devices on the network 101, and in S206 determines whether the extracted device is connected to the network 101. S206 is an example of a connection determination process. Specifically, in a case that the CPU 11 receives via the network 101 information indicating that the extracted device is connected to the network 101, the device is connected to the network 101. Alternatively, the CPU 11 may try communicating with the extracted device, and receive via the network 101 information indicating whether the extracted device is connected to the network 101 or not. In a case that the connection is confirmed (S206: YES), in S207 the CPU 11 add a record having the same information of the device record of the extracted device to the management target device list 50.

After S207, or in a case that the connection is not confirmed (S206: NO), in S208 determines whether searches for all the devices extracted in S204 are complete or not. In a case that it is determined that the searches are not complete, the CPU 11 returns to S205 and tries confirmation of a next device.

In a case the searches are complete (S208: YES), or in a case that it is determined that the network devices connected to the PC through the network are not devices of management targets (S203: NO), in S209 the CPU 11 searches by using the USB-IF 17 devices locally connected to the PC 3. S209 is an example of a connection determination process. Specifically, in a case that the CPU 11 acquires by using the USB-IF 17 information indicating that a device is connected to the PC 3, the CPU 11 determines that the device is connected to the PC 3. Alternatively, the CPU 11 may try communicating with the device and acquire by using the USB-IF 17 information indicating whether the device is connected to the PC 3 or not. In S210 the CPU 11 extracts a device record having a serial number matching a serial number of the found device through the searches from the device list 22, and in S211 adds a record having the information the same as the extracted device record to the management target device list 50.

A local connection interface (the USB-IF 17 in the embodiment) exists on a communication path between devices and the PC 3 which are locally connected with each other. Naturally, the PC 3 communicates with the device (the device 8 for example) locally connected thereto via the local connection interface (the USB-IF 17).

In S212 the CPU 11 determines whether all the devices found through the searches in S209 are added to the management target device list 50. In a case that there is a device not added to the management target device list 50 (S212: NO), the CPU 11 returns to S210, and extract a device record of the next device, and adds a record having pieces of information the same as those included in the extracted device record to the management target device list 50. In a case that it is determined that device records for all the found devices are added to the management target device list 50 (S212: YES), the CPU 11 ends the target device determination process and returns to the DL application process.

Figure 8:
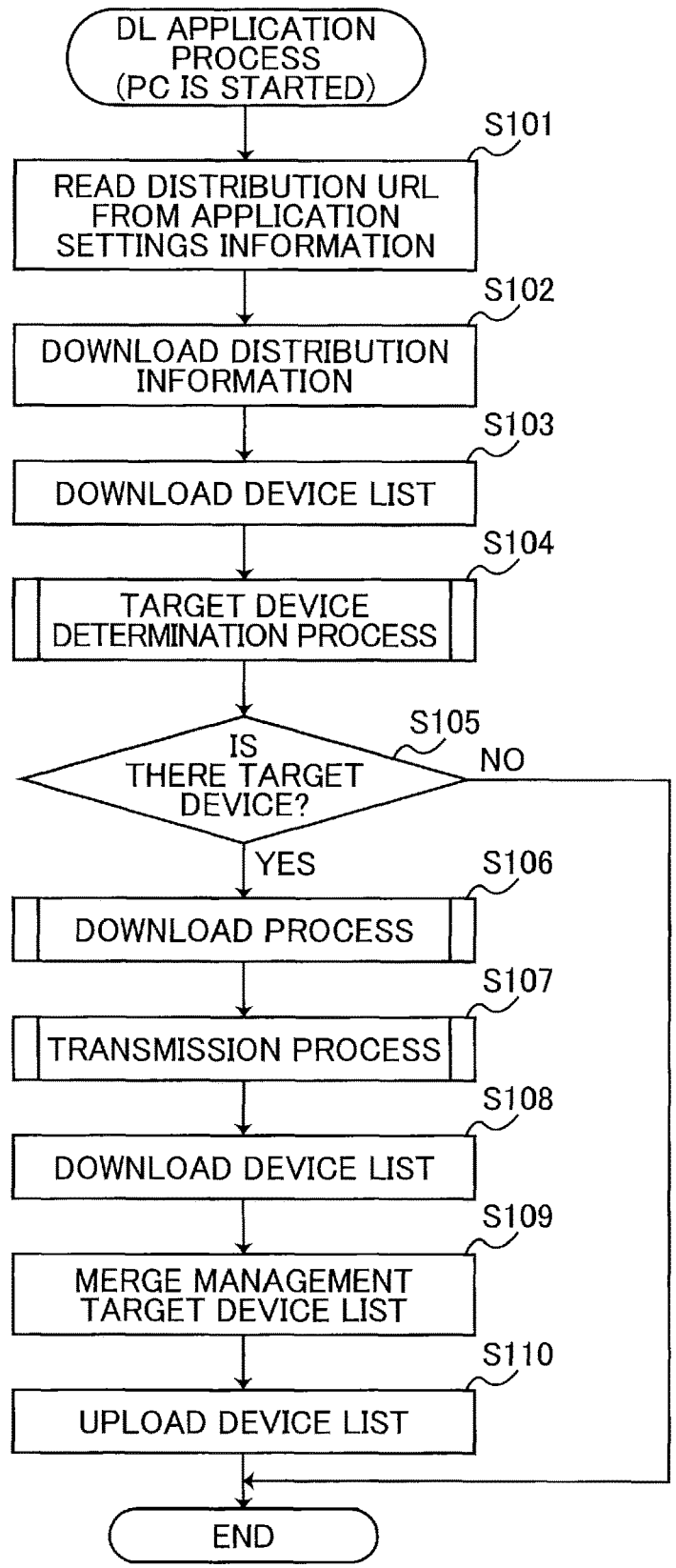
FIG. 8 is a flowchart illustrating a DL application process.

Returning to the description about the DL application process shown in FIG. 8, after the target device determination process of S104, in S105 the CPU 11 determines whether the management target device list 50 includes information of the target device or not. In a case that the target device is included in the management target device list 50 (S105: YES), in S106 executes the download process. The download process is for downloading, in a case that the synchronization folder 44 corresponding to the management target device is not the latest version, the transmission folder 23 of the latest version from the storage server 2.

Figure 10:
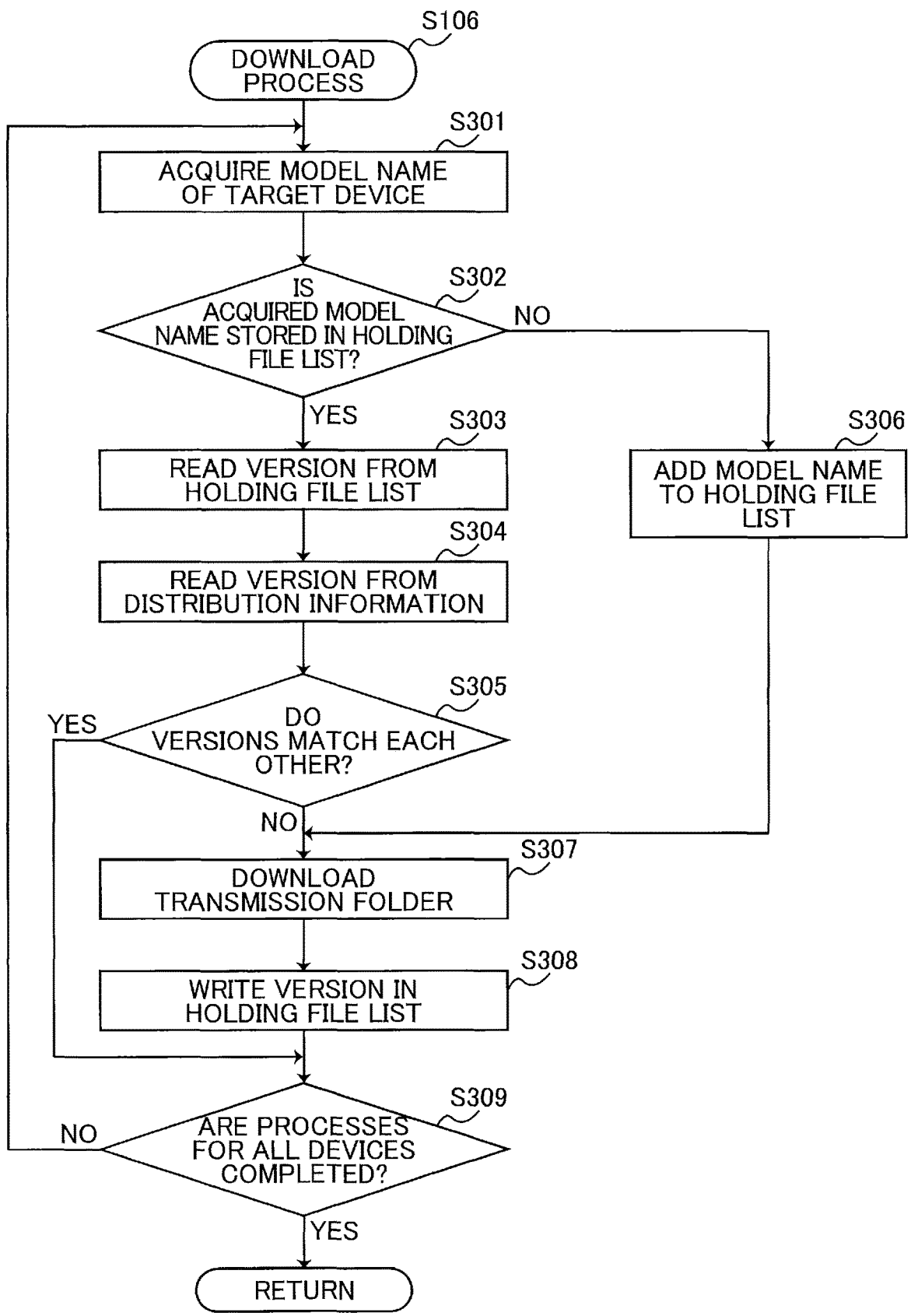
FIG. 10 is a flowchart illustrating a download process.

The download process is described while referring to a flowchart shown in FIG. 10. In S301 the CPU 11 acquires a model name of the target device sequentially from the head of the management target device list 50 for example. In S302 the CPU 11 determines whether the acquired model name is stored in the holding file list 43 or not. As shown in FIG. 3, the holding file list 43 is information storing the version of the synchronization folder 44 for each model name. The version information in the holding file list 43 is an example of a device-side version.

In a case that the model name is included in the holding file list 43 (S302: YES), in S303 the CPU 11 reads the version corresponding to the model from the holding file list 43. S303 is an example of a version reading process.

In S304 the CPU 11 reads a latest version corresponding to the model from the content data information 212 in the distribution information 21 that is downloaded in S102 in the DL application process. As shown in FIG. 5, the content data information 212 includes the latest version information of the transmission folder 23 for each model. The version information in the content data information 212 is an example of a server-side version. S102 in the DL application process and S304 in the download process are examples of a version download process.

In S305 the CPU 11 determines whether the version read in S303 matches the version read in S304. In a case that the version of the holding file list 43 matches the version of the content data information 212, the synchronization folder 44 stored in the PC 3 is synchronized with the transmission folder 23 of the latest version. In this case, downloading the transmission folder 23 is unnecessary this time.

On the other hand, in a case that the model name is not included in the holding file list 43, in S306 the CPU 11 adds the model name to the holding file list 43. After S306, or in a case that the version of the holding file list 43 does not match the version of the content data information 212 (S305: NO), in S307 the CPU 11 downloads the transmission folder 23 of the model. S307 is an example of a content data download process. The CPU 11 acquires the URL designating the storage location of the latest transmission folder 23 corresponding to the model from the content data information 212 of the distribution information 21. Subsequently, the CPU 11 downloads the transmission folder 23 and generates a synchronization folder 44 of the model.

In S308 the CPU 11 writes the version information 233 of the transmission folder 23, as the version information of the synchronization folder 44 corresponding to the model, in the holding file list 43. S308 is an example of device-side version updating process.

After S308, or in a case that the version of the holding file list 43 matches the version of the content data information 212 (S305: YES), in S309 the CPU 11 determines whether processes for all the devices included in the management target device list 50 are complete or not. In a case that it is determined that there is unprocessed device (S309: YES), the CPU 11 returns to S301, and repeats the processes for all the devices until the synchronization folders 44 become latest versions.

In a case that the processes for all the devices are complete (S309: YES), the CPU 11 ends the download process and returns to the DL application process. As a result, in the example shown in FIG. 1, the PC 3 has stored the synchronization folder 44 of the latest version for each model of the devices 5-8.

The description returns to the DL application process shown in FIG. 8. In S107 the CPU 11 executes the transmission process after the download process of S106. The transmission process is for transmitting files and sets of data stored in the synchronization folder 44 to target devices.

Figure 11:
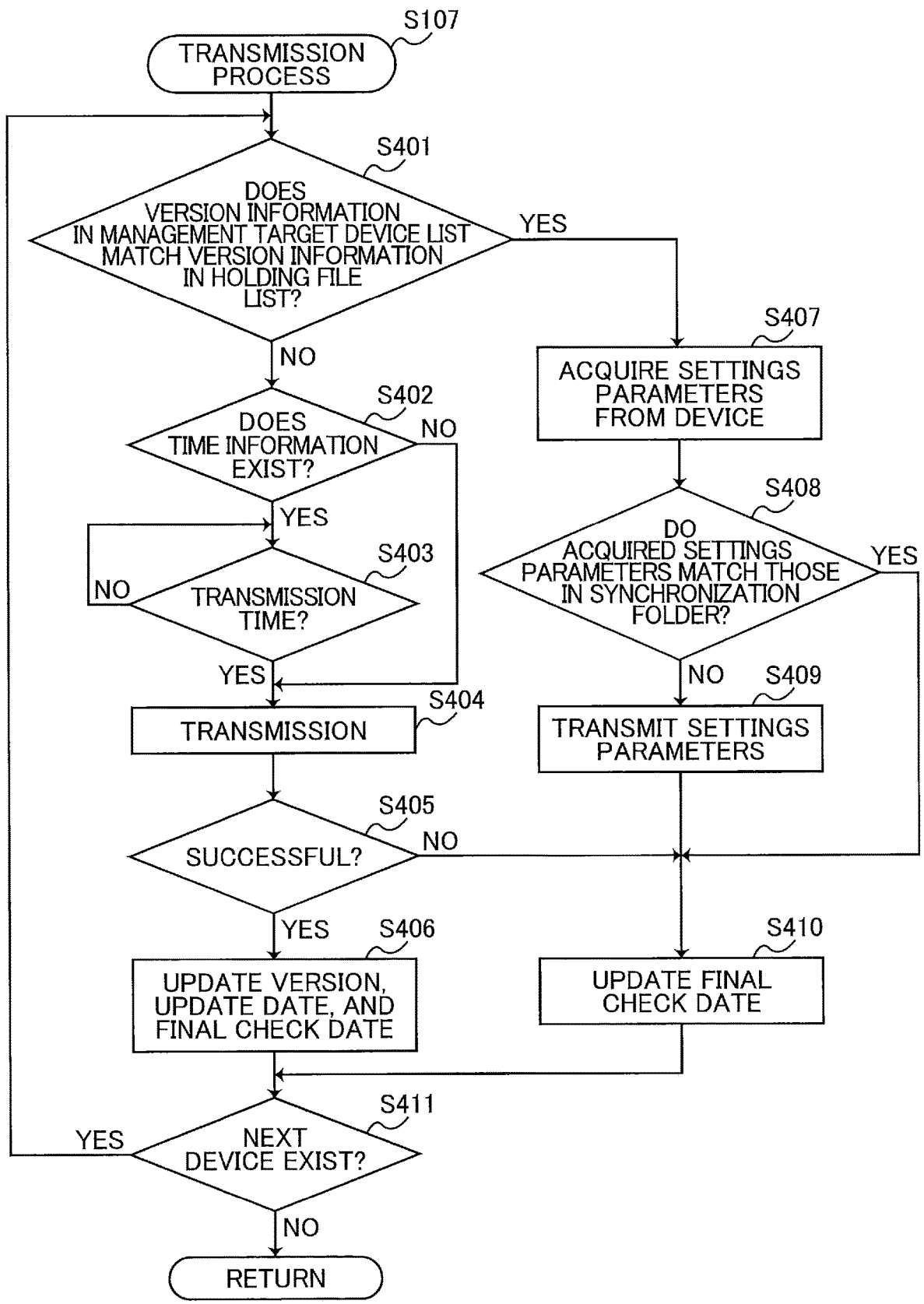
FIG. 11 is a flowchart illustrating a transmission process.

The transmission process will be described while referring to a flowchart shown in FIG. 11. In S401 of the transmission process, the CPU 11 select one (device) record sequentially from the head record of the management target device list 50 for example, and determines whether the version information acquired from the management target device list 50 matches the version information acquired from the holding file list 43. Configurations of each record in the management target device list 50 are the same as those of the device record in the device list 22. Thus, the management target device list 50 includes same types of information as the version information 225 of the device list 22. The version information 225 of the device list 22 indicates the version of the synchronization folder 44 that has already been transmitted to the corresponding device. On the other hand, the version information of the holding file list 43 indicates the version newer than the already-transmitted synchronization folder 44 in a case that the downloading the transmission folder 23 is executed in the download process.

In a case that the versions are not matched each other for the selected device (S401: NO), in S402 the CPU 11 determines whether the time information 424 of the application settings information 42 specifies a transmission time or not. The transmission time is a time when the files or sets of data are transmitted to the device. In a case that the transmission time is restricted, the time information 424 specifies a transmission time.

In a case that the time information 424 specifies the transmission time (S402: YES), in S403 the CPU 11 determines whether the current time is the transmission time specified by the time information 424. In a case that the current time is not the transmission time (S403: NO), the CPU 11 waits until the transmission time.

In a case that it is determined that the time information 424 does not specify the transmission time (S402: NO), or, in a case that it is determined that the current time is the transmission time (S403: YES), in S404 the CPU 11 opens the synchronization folder 44 corresponding to the model of the selected device and transmits files and sets of data stored therein to the selected device. S404 is an example of a transmission process.

In S405 the CPU 11 determines whether the transmission is successful or not. For example, in a case that there occurs neither error about device nor communication error during the transmission, the CPU 11 may determine that the transmission is successful. In a case that the transmission is successful (S405: YES), in S406 the CPU 11 updates the version information, the update date, and the final check date in the management target device list 50 for the selected device. That is, the version information is updated to indicate the version of the synchronization folder 44 transmitted this time, and modifies the update date and the final check date to the current date. The update date is an example of an execution date of a transmission process, and an example of transmission result information.

On the other hand, in a case that it is determined that the version information acquired from the management target device list 50 matches the version information acquired from the holding file list 43 (S401: YES), in S407 the CPU 11 acquires settings parameters from the selected device. Further, in S408 the CPU 11 determines whether information of the acquired settings parameters matches information of the settings parameters included in the synchronization folder 44 of the selected model.

In a case that the settings parameters 232 are stored in the transmission folder 23, the synchronization folder 44 also stores the settings parameters 232. When transmitting all the files and sets of data stored in the synchronization folder 44, the settings parameters 232 are transmitted. Therefore, the settings parameters immediately after the transmission match the settings parameters 232 stored in the synchronization folder 44. Thereafter, the device receives a user's operation to modify the settings, the settings parameters in the device may be modified. In a case that the settings parameters are modified after the transmission, the settings parameters in the device do not match the settings parameters 232 in the synchronization folder 44.

In a case that it is determined that settings parameters do not matched each other (S408: NO), in S409 the CPU 11 transmits, to the selected device, only settings parameters from among various files and data stored in the synchronization folder 44. S409 is an example of a selected transmission process and an example of a parameter transmission process.

The device restarts when the firmware is updated. Such a restart may cause inconvenience on the user. Thus, fewer transmissions of firmware are desirable. When the versions match between the management target device list 50 and the holding file list 43, there is likely that the firmware is latest version, and thus there is little requirement to transmit the firmware. In S409 only the settings parameters are transmitted, and thus settings of the device are recovered. In this case, the device need not to restart.

After S409, or in a case that it is determined that the settings parameters match each other (S408: YES), or in a case that it is determined that the transmission is result in failure (S405: NO), in S410 the CPU 11 only updates the final check date to the current date in the management target device list 50.

After S406 or after S410, in S411 the CPU 11 determines whether a next device (unselected device) exists in the management target device list 50 or not. In a case that it is determined that a next device exists (S411: YES), the CPU 11 returns to S401 and executes similar processes for the next device. In a case that it is determined that the processes are complete for all the devices in the management target device list 50 (S411: YES), the CPU 11 ends the transmission process, and returns to the DL application process. When transmission for all the devices are successful, the firmware is latest version for each of the devices of management targets by the PC 3.

Returning to the DL application process shown in FIG. 8, after the transmission process of S107, in S108 the CPU 11 downloads again the device list 22 from the storage server 2. S108 is an example of a device list download process. S108 is an example of a device list download process at second timing.

In S109 the CPU 11 merges the management target device list 50 with the device list 22 downloaded recently. Accordingly, in a case that the update data and the final check date are updated for any device in the management target device list 50, pieces of information in the device list 22 are updated. S109 is an example of a transmission result writing process.

In S110 the CPU 11 uploads the merged device list 22, with which the management target device list 50 is merged, to the storage server 2. S110 is an example of a device list upload process. After S110, or in a case that it is determined that there is no target device (S105: NO), the CPU 11 ends the DL application process.

As described in detail, the system 1 according to the embodiment, the administrator of the storage server 2 previously stores the device list 22, and the transmission folder 23, and etc. in the storage server 2. The PCs 3-4 download the device list 22 and transmit, to each management target device identified by the identification information in the device list 22, files and sets of data stored in the corresponding transmission folder 23. Accordingly, the firmware and etc. are updated for each of the management target devices 5-9 connected to the PCs 3-4. That is, the administrator of the storage server 2 can manage sets of data for the management target devices 5-9 connected to the PCs 3-4. The device list 22 includes a plurality of pieces of identification information for identifying the management target devices. For each of the plurality of target devices 5-9 of management targets, the PCs 3 and 4 can download the corresponding transmission folder 23 from the storage server 2 and transmits files or sets of data therein to the corresponding device. Accordingly, the plurality of devices can be managed easily by the storage server 2.

In the embodiment, the PCs 3-4 include transmission results in the device list 22 and upload to the storage server 2 the device list 22 in which transmission results are written. Accordingly, the administrator of the storage server 2 recognizes the transmission results by reading the device list 22 in the storage server 2, and understands the transmission situation of each management target device. Specifically, in the embodiment, in a case that transmission of files and sets of data stored in the synchronization folder 44 is successful, the update date 226 in the device list 22 is updated. Thus, the administrator of the storage server 2 can easily understand the transmission situation for each of the management target devices.

There is a possibility that the device list 22 is updated by other PCs in a period after the PC 3 or 4 downloads device list 22 to generate the management target device list 50 and before the transmission process is complete. In the embodiment, the device list 22 is downloaded again after the transmission process, and the management target device list 50 is merged with the device list 22 that is downloaded again, whereby consistency of the device list 22 can be assured.

In the embodiment, the PCs 3-4 completes download of the transmission folder 23, transmission of files and sets of data to the device, and upload of transmission results, without receiving user operations. Accordingly, burden of operations by the user of the PCs 3-4 can be reduced and the usability can be improved.

In the embodiment, the version information 233 is attached to the transmission folder 23 having the plurality of files and sets of data such as the firmware and settings parameters. Accordingly, the files and the sets of data in the transmission folder 23 can be managed together. The administrator of the storage server 2 can easily manage each file to be transmitted. Necessity of downloading the plurality of files can be determined by the version of the transmission folder 23, thereby reducing processing loads of the PCs 3-4 and the storage server 2.

The transmission folder 23 includes the plurality of types of files and data, such as, the settings parameters 232 that may be modified by the user's operation after the settings parameters are transmitted to the device. In the embodiment, in a case that the transmission folder 23 is not downloaded and the current settings parameters in the management target device does not match the settings parameters stored in the synchronization folder 44, the settings parameters stored in the synchronization folder 44 are transmitted to the device again. Accordingly, the settings parameters can be recovered to the values in accordance with intention of the administrator of the storage server 2. On the other hand, it is highly likely that the firmware is not changed by the user's operation. Therefore, in a case that the transmission folder 23 is not downloaded, the firmware is not transmitted to the management target device, thereby reducing useless processes.

In the embodiment, the PCs 3-4 complete acquisition of the settings parameters and transmission of the settings parameters, without receiving a user's operation. Accordingly, few burdens are required for the users of the PCs 3-4. Accordingly, the usability can be improved.

In a case that the plurality of PCs 3-4 is in connection with the same network 101 as shown in the system 1, for example, it is wasteful that each of the plurality of PCs 3-4 downloads the transmission folder 23 corresponding to the same device and transmits files and sets of data to the same device. In the embodiment, the administrator previously stores information indicating that the devices 5-7 connected to the network are management target devices in the target device information 422 of the specific PC (the PC 3 for example) only. Thus, only the specific PC 3 executes download and transmission of the transmission folders 23 corresponding to the devices 5-7. Accordingly, the wasteful operations can be eliminated.

In the embodiment, the PCs 3-4 complete processes from reading the target device information 422 to transmitting the synchronization folder 44 without receiving user's operations. Accordingly, burden of operations by the user of the PCs 3-4 can be reduced and the usability can be improved.

If files or data would be transmitted at the time of day in which the management target devices are frequently use, there is likely that such transmission inconveniences users of these management target devices. On the other hand, in the embodiment, since the administrator previously stores the time information 424, it is possible to transmit files and data at time that the target devices are less frequently used, such as night or break time. Accordingly, the inconvenience described above can be reduced.

Further, in a case that a plurality of branch offices is managed, there is a possibility that pieces of IP address information might be duplicate. In the embodiment, only the PC whose location matches that of the management target device checks connection based on comparison between the location information 423 of the application settings information 42 and the location information 224 of the device list 22. Accordingly, if the same IP address is accidentally set in another location, wrong transmission of information can be prevented.

In the embodiment, the model information 221 is included in the device list 22, and the transmission folder 23 is prepared for each model. Accordingly, the transmission folder 23 can be downloaded for each model of target devices, thereby improving usability of the application program.

In the embodiment, each of the PCs 3-4 includes the NW-IF 16 and the USB-IF 17, and can set any device connected thereto via any one of interfaces 16 and 17 as a device of management target. That is, each of the PCs 3-4 can transmit files and sets of data in the synchronization folder 44 to a device even if the device is locally connected to the PC (the device is connected to the PC via the USB).

In the embodiment, the application settings information 42 is distributed together with the DL application 41 to each of the PCs 3-4 by the administrator of the storage server 2. Each of the PCs 3-4 can acquire a storage location of each set of data in the storage server 2 by referring to the application settings information 42.

The present embodiment is an exemplification, and thus not limit the invention. Therefore, various improvements and modifications can be made on the disclosed technique in the present specification without departing from the scope of the invention. For example, though both the PCs 3 and 4 execute the DL application process in the embodiment, the PC 4 may not execute the DL application process in a case that that the PC 3 can manage all the devices located in the branch office.

In the embodiment, the storage server 2 is provided with a plurality of transmission folders corresponding to respective ones of the plurality of models. However, the storage server 2 may store only the transmission folder corresponding to a specific model. That is, a plurality of storage servers 2 may be deployed for respective ones of models. In the storage server 2, a storage medium storing the device list 22 may be the same or different from a storage medium storing the transmission folder. In other words, the number of the storage servers 2 may be one or more.

The transmission folder 23 may not store both of the firmware and the settings parameters but store either one of the firmware and the settings parameters. Alternatively, the transmission folder 23 may store a plurality of sets of firmware, or the transmission folder 23 may store pluralities of settings parameters. Or, the transmission folder may store at least one of a file and data. Or, files to be transmitted may not be stored in a folder.

In the embodiment, the transmission folder 23 is not downloaded in a case that the version of the synchronization folder 44 matches the version of the transmission folder 23, but the transmission folder 23 may be downloaded in such a case. That is, a latest transmission folder 23 may be downloaded when the DL application process is executed regardless of the version of the transmission folder 23. In the embodiment, the version of the already-transmitted synchronization folder 44 is acquired based on the version information 225 of the device list 22. However, the version of the already-transmitted synchronization folder 44 may be acquired by inquiring the corresponding device of the version. The transmission to the device may be executed every time and regardless of the version.

In the embodiment, the settings parameters are acquired from the device, and in a case that any settings parameter is modified, settings parameters are transmitted. However, the settings parameters of the device may not be checked. Specifically, S407 and S408 may be deleted from the transmission process, and in a case that determination of YES is made in S401, then S409 may be executed.

The download process and the transmission process may not be successively executed. For example, the processes to S106 may be separated from the processes from S107, and the former processes may be executed during midday, and the latter processes may be executed at night, for example.

Date information is written in the update date 226 and the final check date 227. Time (or hour) information as well as the date information may written in the update date 226 and the final check date 227. In a case that the DL application process is executed on weekly basis, week information may be written in the update date 226 and the final check date 227.

In the plurality of flowcharts disclosed in the embodiment, a processing order of a plurality of processes of a plurality of arbitrary steps may be modified arbitrary and a plurality of processes of a plurality of arbitrary steps may be executed in parallel, provided that no inconsistency occurs.

The processes disclosed in the embodiment may be executed by a single CPU, a plurality of CPUs, hardware such as an ASIC, and a combination of these. The processes disclosed in the embodiment can be achieved in various manners such as a storage medium recording programs for executing these processes, and a method.

What is claimed is:

1. A non-transitory computer readable storage medium storing a set of program instructions installed on and executed by an information processing device having a computer and a communication interface, the set of program instructions causing the computer to execute:

a device list download process to download a device list from a storage server via the communication interface, the device list including a plurality of pieces of identification information corresponding to respective ones of a plurality of management target devices;

a connection determination process to determine for each management target device included in the device list whether or not the management target device identified by the piece of identification information is connected to the information processing device via the communication interface;

a content data download process to download content data from the storage server via the communication interface; and a transmission process to transmit, to the target management device that is determined to be connected to the information processing device in the connection determination process, the content data which is downloaded in the content data download process via the communication interface and corresponds to the target management device, wherein the set of the set of program instructions causes the computer to further execute a transmission result writing process to write, for each management target device to which the content data is transmitted, transmission result information to be associated with the piece of identification information identifying the each management target device in the device list, the transmission result information indicating a result of the transmission process, and a device list uploading process to upload the device list in which the transmission result information is written in the transmission result writing process to the storage server via the communication interface.

2. The non-transitory computer readable storage medium according to claim 1, wherein the set of the set of program instructions causes the computer to further execute, in the content download process, downloading, for each management target device that is determined to be connected to the information processing device in the connection determination process, downloading content data corresponding to the each management target device from the storage server.

3. The non-transitory computer readable storage medium according to claim 1, wherein in the transmission result writing process, in a case that the content data is transmitted to the management target device, the transmission result information indicating an execution date of the transmission process is written associated with the piece of identification information identifying the management target device in the device list whereas in a case that the content data is not transmitted to the management target device, the transmission result information indicating the execution date of the transmission process is not written in the device list.

4. The non-transitory computer readable storage medium according to claim 1, wherein the device list download processes are executed at least two timings including a first timing and a second timing, the first timing being before the connection determination process, the second timing being after the transmission process and before the transmission result writing process, wherein the transmission result writing process writes the transmission result information in the device list which is downloaded in the device list download process executed at the second timing.

5. The non-transitory computer readable storage medium according to claim 1, wherein after the computer starts operating according to the set of program instructions, the device list download process is executed without receiving an operation via a user interface provided in the information processing device, wherein after the device list is downloaded in the device list download process, the connection determination process is executed without receiving an operation via the user interface, wherein after the connection determination process is executed, the content data download process and the transmission process are executed, wherein after the transmission process is executed, the transmission result writing process and the device upload process are executed without receiving an operation via the user interface.

6. The non-transitory computer readable storage medium according to claim 1, wherein the transmission process tries reading, from a memory provided in the information processing device, time information which is stored in association with the set of program instructions in the memory, the time information indicating a time to transmit the content data, wherein in a case that the time information is read from the memory, the transmission process transmits the content data at a time indicated by the time information.

7. The non-transitory computer readable storage medium according to claim 1, wherein the device list stores model information associated with a piece of identification information of the management target device, the model information indicating a model of the management target device,
wherein the storage server stores content data for each model of devices,
wherein the content data download process downloads, for each device, the content data corresponding to a model indicated by the model information of the piece of identification information of the each device from the storage server.

8. The non-transitory computer readable storage medium according to claim 1, wherein the communication interface includes a network interface and a local interface,
wherein the information processing device is configured to execute:
connecting to the storage server via the network interface;
communicating with the storage server via the network interface in each of the device list download process and the content data download process;
determining whether the management target device is connected via the local interface in the connection determination process; and
in a case that the management target device is connected to the information processing device via the local interface, transmitting the content data to the management target device by using the local interface in the transmission process.

9. The non-transitory computer readable storage medium according to claim 1, wherein the set of the set of program instructions causes the computer to further execute:
reading, from a memory provided in the information processing device, a distribution URL which is stored in association with the set of program instructions in the memory, the distribution URL indicating a URL designating a storage location storing distribution information, the distribution information including device list URL and content data URL, the device list URL designating a storage location storing the device list, the content data URL designating a storage location storing the content data; and
a distribution information download process to download the distribution information via the communication interface from the storage location designated by the distribution URL read from the memory,
wherein the device list download process downloads the device list from the storage location designated by the device list URL included in the distribution information,
wherein the content data download process downloads the content data from the storage location designated by the content data URL included in the distribution URL.

10. A non-transitory computer readable storage medium storing a set of program instructions installed on and executed by an information processing device having a computer and a communication interface, the set of program instructions causing the computer to execute:
a device list download process to download a device list from a storage server via the communication interface, the device list including a plurality of pieces of identification information corresponding to respective ones of a plurality of management target devices;
a connection determination process to determine for each management target device included in the device list whether or not the management target device identified by the piece of identification information is connected to the information processing device via the communication interface;
a content data download process to download content data from the storage server via the communication interface; and
a transmission process to transmit, to the target management device that is determined to be connected to the information processing device in the connection determination process, the content data which is downloaded in the content data download process via the communication interface and corresponds to the target management device,
wherein the content data download process downloads a content set having a plurality of sets of content data from the storage server, a version being attached to the content set in the storage server,
wherein the set of program instructions causes the computer to further execute
a version download process to download a server-side version indicating the version of the content set from the storage server via the communication interface,
a version reading process to read a device-side version indicating a version of the content set from a memory provided in the information processing device, and
in a case that the sever-side version is newer than the device-side version, the content data download process and a device-side version updating process to update a value of the device-side version in the memory to a value of the server-side version,
wherein in a case that the sever-side version is not newer than the device-side version, neither the content data download process nor the device-side version updating process is executed,
wherein the transmission process transmits the content set downloaded in the content data download process, and holds the content set in a memory provided in the information processing device after the content set is transmitted,
wherein each set of content data included in the content set is capable of including first type content data and second type content data,
wherein in a case that the content data download process is executed based on the sever-side version being newer than the device-side version, the transmission process is executed successively after the content data download process,
wherein the set of program instructions causes the computer to further execute
in a case that the content data download process is not executed based on the sever-side version being not newer than the device-side version
acquiring from the management target device first type content data stored in the management target device, and
in a case that the first content data acquired from the management target device is different from the first type content data included in the content set stored in the memory, a selective transmission process to transmit the first type content data included in the content data set stored in the memory to the management target device without transmitting the second type content data included in the content set stored in the memory to the management target device.

11. The non-transitory computer readable storage medium according to claim 10, wherein in the case that the content data download process is not executed based on the sever-side version being not newer than the device-side version, the acquiring from the management target device the first type content data is executed without receiving an operation via a user interface provided in the information processing device;
   wherein in the case that the first content data acquired from the management target device is different from the first type content data included in the content set stored in the memory, the selective transmission process is executed without receiving an operation via a user interface provided in the information processing device.

12. The non-transitory computer readable storage medium according to claim 10, wherein the transmission process transmits the content set downloaded in the content data download process, and holds the content set in a memory of the information processing device after the content set is transmitted,
   wherein each set of content data included in the content set is capable of including a settings parameter of the management target device,
   wherein in a case that the content data download process is executed based on the sever-side version being newer than the device-side version, the transmission process is executed successively after the content data download process,
   wherein the set of program instructions causes the computer to further execute
      in a case that the content data download process is not executed based on the sever-side version being not newer than the device-side version
         acquiring from the management target device a settings parameter which is stored in the management target device and corresponds to a settings parameter from among the plurality of sets of content data included in the content set stored in the memory, and
      in a case that the settings parameter acquired from the management target device is different from the settings parameter included in the content set stored in the memory, a parameter transmission process to transmit the settings parameter included in the content set stored in the memory to the management target device.

13. The non-transitory computer readable storage medium according to claim 12, wherein in the case that the content data download process is not executed based on the sever-side version being not newer than the device-side version, the acquiring the settings parameter is executed without receiving an operation via a user interface provided in the information processing device,
   wherein in the case that the settings parameter acquired from the management target device is different from the settings parameter included in the content set stored in the memory, the parameter transmission process is executed without receiving an operation via the user interface.

14. A non-transitory computer readable storage medium storing a set of program instructions installed on and executed by an information processing device having a computer and a communication interface, the set of program instructions causing the computer to execute:
   a device list download process to download a device list from a storage server via the communication interface, the device list including a plurality of pieces of identification information corresponding to respective ones of a plurality of management target devices;
   a connection determination process to determine for each management target device included in the device list whether or not the management target device identified by the piece of identification information is connected to the information processing device via the communication interface;
   a content data download process to download content data from the storage server via the communication interface; and
   a transmission process to transmit, to the target management device that is determined to be connected to the information processing device in the connection determination process, the content data which is downloaded in the content data download process via the communication interface and corresponds to the target management device,
   wherein the device list is capable of including a piece of first identification information and a piece of second identification information as a piece of identification information, the piece of first identification information indicating address information of a device connected to network, the piece of second identification information not indicating address information,
   wherein the set of program instructions causes the computer to further execute
      a transmission target information reading process to read, from a memory of the information processing device, transmission target information which is stored in association with the set of program instructions in the memory, the transmission target information being information indicating that the management target devices connected to network are set as transmission target of content data,
   wherein in a case that the transmission target information can be read in the transmission target information reading process, the transmission process sets the management target device indicated by the piece of first identification information to be included in the transmission target of the content data whereas in a case that the transmission target information cannot be read in the transmission target information reading process, the transmission target information does not set the management target device indicated by the piece of first identification information in the transmission target of the content data to be included in the transmission target of the content data.

15. The non-transitory computer readable storage medium according to claim 14, wherein the transmission target information reading process is executed without receiving an operation via a user interface provided in the information processing device after the computer starts operating according to the set of program instructions,
   wherein after the transmission target information reading process is executed, the transmission process transmits the content data associated with the management target device without receiving the operation via a user interface.

16. A non-transitory computer readable storage medium storing a set of program instructions installed on and executed by an information processing device having a computer and a communication interface, the set of program instructions causing the computer to execute:
- a device list download process to download a device list from a storage server via the communication interface, the device list including a plurality of pieces of identification information corresponding to respective ones of a plurality of management target devices;
- a connection determination process to determine for each management target device included in the device list whether or not the management target device identified by the piece of identification information is connected to the information processing device via the communication interface;
- a content data download process to download content data from the storage server via the communication interface; and
- a transmission process to transmit, to the target management device that is determined to be connected to the information processing device in the connection determination process, the content data which is downloaded in the content data download process via the communication interface and corresponds to the target management device,
- wherein the device list includes location information designating an installation location associated with a piece of identification information of the management target device,
- wherein the set of program instructions causes the computer to further execute a device self location information reading process to read, from a memory provided in the information processing device, device self location information stored in association the set of program instructions in the memory, the device self location information designating an installation location of the information processing device,
- wherein in a case that the device self location information can be read in the device self location information reading process and a device has installation location which is designated by the location information associated by a piece of identification information of the device and matches the installation location designated by the device self location information, the transmission process sets the device to be included in the transmission target of the content data, whereas in a case that a device has installation location, which is designated by the location information associated by a piece of identification information of the device and does not match the installation location designated by the device self location information, the transmission process does not set the device to be included in the transmission target of the content data.

* * * * *